Figure 1:
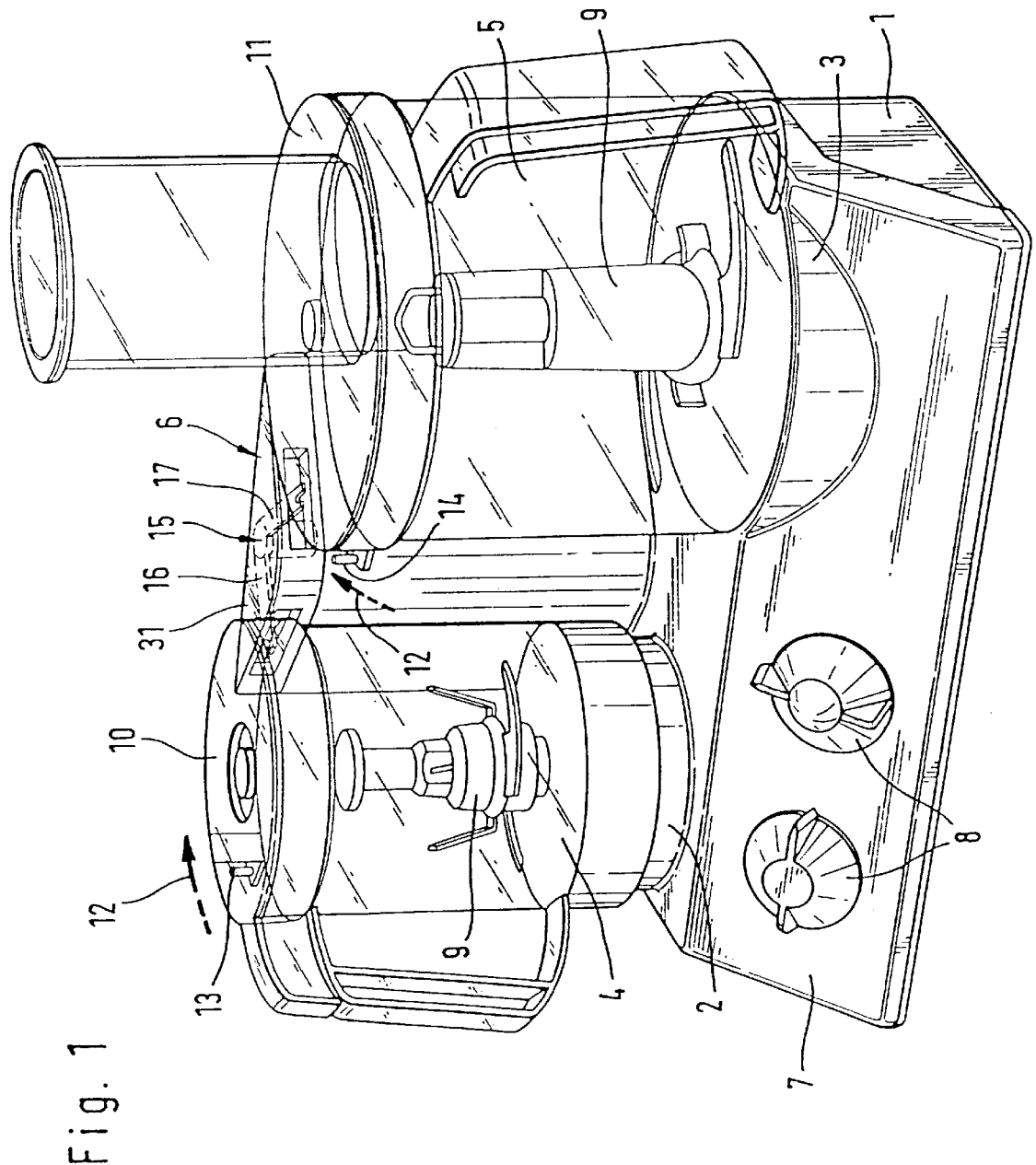

United States Patent
Börger et al.

[19]
[11] Patent Number: 5,979,806
[45] Date of Patent: Nov. 9, 1999

[54] FOOD PROCESSOR

[75] Inventors: Georg Börger, Steinbach; Bernd Pfeiffer, Bad Vilbel, both of Germany

[73] Assignee: Braun GmbH, Frankfurt, Germany

[21] Appl. No.: 09/243,706

[22] Filed: Feb. 3, 1999

Related U.S. Application Data

[63] Continuation of application No. PCT/EP97/05825, Oct. 22, 1997.

[30] Foreign Application Priority Data

Nov. 11, 1996 [DE] Germany .......................... 196 46 423

[51] Int. Cl.$^6$ .............................. B02C 18/12; B02C 18/24
[52] U.S. Cl. ...................... 241/37.5; 241/92; 241/101.01; 241/282.1
[58] Field of Search ........................... 241/37.5, 92, 100, 241/101.01, 282.1, 282.2; 99/492, 510; 366/291, 601

[56] References Cited

U.S. PATENT DOCUMENTS

| | | | |
|---|---|---|---|
| 3,722,831 | 3/1973 | Bialas et al. | 259/6 |
| 4,373,677 | 2/1983 | Kunihiro | 241/37.5 |
| 4,387,860 | 6/1983 | Necas et al. | 341/282.1 |
| 4,471,915 | 9/1984 | Levin et al. | 241/37.5 |
| 4,572,445 | 2/1986 | Cristante | 241/37.5 |
| 4,799,626 | 1/1989 | Hickel et al. | 241/37.5 |
| 4,819,882 | 4/1989 | Stottmann et al. | 241/92 |
| 5,222,430 | 6/1993 | Wang | 241/37.5 X |
| 5,380,086 | 1/1995 | Dickson | 241/282.2 X |
| 5,524,530 | 6/1996 | Nijzingh et al. | 241/37.5 X |
| 5,556,198 | 9/1996 | Dickson, Jr. et al. | 366/97 |
| 5,875,706 | 3/1999 | Borger et al. | 241/37.5 X |

FOREIGN PATENT DOCUMENTS

| | | |
|---|---|---|
| 0 475 470 A2 | 3/1992 | European Pat. Off. . |
| 0 549 818 A1 | 7/1993 | European Pat. Off. . |
| 31 49 072 A1 | 6/1983 | Germany . |
| 39 33 036 A1 | 4/1991 | Germany . |

*Primary Examiner*—John M. Husar
*Attorney, Agent, or Firm*—Fish & Richardson P.C.

[57] ABSTRACT

A food processor is known which comprises a base unit (1, 6) having at least two separate mounts (2, 3) for one processing container (4, 5) each. A respective rotary drive shaft is disposed in the area of each mount (2, 3), which drive shaft is adapted to drive a processing tool (9) insertable into the processing container (4, 5) for the processing of food materials. The drive shafts are connected to an electric motor (29) by a transmission mechanism. A switch device (S1) is provided downstream from and in series with a manually actuatable main switch (8; S3) to enable electric current to be released to the motor (29), said switch device being adapted to be turned on or off by movement of a lid (10, 11) which closes or opens the respective processing container (2, 3), such that an actuating element (13, 14) formed on the lid (10, 11) displaces a lever arrangement (15) connected with the switch device (S1) in such fashion as to cause actuation of a switching contact (23). In order to achieve a simple design for such a switch device which serves as a safety device, a common motor switching contact (23) for releasing electric current to the motor (29) is assigned to the lids (10, 11). According to the present invention, this motor switching contact (23) is actuated by a lever arrangement (15) mounted in the housing (6) and comprising two sections (16, 17).

10 Claims, 2 Drawing Sheets

FOOD PROCESSOR

This application is a continuation of PCT/EP97/05825 filed Oct. 22, 1997.

This invention relates to a food processor, comprising a base unit having at least two separate mounts for one processing container each, with a respective rotary drive shaft being disposed in the area of each mount, which drive shaft is adapted to drive a processing tool insertable into the processing container for the processing of food materials, said drive shafts being connected to an electric motor by a transmission mechanism, and with a switch device being provided downstream from and in series with a manually actuatable main switch to enable electric current to be released to the motor, said switch device being adapted to be turned on or off by movement of a lid which closes or opens the respective processing container, such that an actuating element formed on the lid displaces a lever arrangement connected with the switch device in such fashion as to cause actuation of a switching contact.

A food processor of the type indicated in the foregoing is known from DE-C 39 33 036. Such a food processor which is also referred to as a multi-purpose food processor finds application wherever a variety of tasks are to be performed such as, for example, kneading, mixing and beating. To make such a food processor flexible, two processing containers—the large one being used for mixing, comminuting, kneading, the small one for blending or comminuting—are provided which are each associated with a separate drive spindle. A motor disposed in a base unit drives these two spindles at different speeds due to the provision of a different transmission ratio of the drive shaft and the motor to the respective drive spindle.

For safety reasons the processing containers of the food processor of the type described in the foregoing are locked in predetermined positions in the base unit in order to establish a reliable driving connection between the processing container and the base unit and to ensure that the processing container remains connected with the base unit during operation, particularly at instants of time when a certain unbalance produced by a distribution of the food materials to be processed occurs in the container. A further safety provision necessary for such food processors is that the motor is prevented from running until the lid placed on the processing container is securely locked therewith, thus making it impossible for the user to reach inside the container with the lid open and have access to the rotating processing tool such as, for example, a mixing or cutting tool. Any attempt to open such a lid or any direct removal of the lid turns off the motor instantly.

With regard to the safety provision indicated in the foregoing which relates to the opening of a lid of the processing container while the motor is running, DE-C2 39 33 036 makes provision for a separate switch for each processing container or its associated lid, whose switching contact is placed in the current path to the motor. When the respective switch associated with the one or the other lid of the respective processing container is actuated, the current path is either interrupted (lid removed from the processing container) or closed (lid seated onto the processing container). Each switching contact possesses a lever-type pin that engages in an actuating cam formed on the respective processing container. The safety device described above has proven to be successful and efficient in practical use.

On the basis of the prior art referred to in the foregoing, it is an object of the present invention to improve upon a safety device of the described type in such manner that it is of simple construction and that, in addition, these switching functions are coupled in respect of the lid of the one processing container and the lid of the other processing container.

On the basis of the known food processor initially described, this object is accomplished in that the lids are assigned a common motor switching contact for the release of electric current to the motor, and that this motor switching contact is actuatable by a lever arrangement mounted in the housing and comprising two sections, with the position of the lever arrangement relative to the position of the lids of the processing containers being oriented such that the one section of the lever arrangement is actuatable by the actuating element of the one lid, while the other section of the lever arrangement is actuatable by the actuating element of the other lid.

With the arrangement of the present invention, only one single switch is needed which in respect of its switching function is associated with both the one lid and the other lid of the at least two processing containers through a corresponding lever arrangement.

In the configuration of the present invention, the one switch associated with both lids of the processing containers is pivoted by the respective lid when it is fitted onto the processing container in a predetermined direction, such that starting from an initial position in which the switching contact is open and no current is supplied to the motor, the switching contact is closed; the current path to the motor is then closed enabling the appliance to be turned on by actuation of an appliance main switch. The arrangement manages not only with one single switch but also with one single lever arrangement for actuation of the switch, for which purpose the lever arrangement is subdivided into two sections which are associated with the one and the other lid provided that the food processor has only two processing containers and respective lids.

According to a preferred aspect the lever arrangement is assigned a neutral initial position to which it returns following a reversal of the direction of movement of a lid, that is, starting from a contact making position. In such an initial position the lever arrangement is oriented such as to be actuatable by the one or the other lid, depending on which processing container is to be used, in order to move the switch to its contact making position, which then enables the motor to be turned on by a main switch. The automatic return to the initial position is accomplished by a spring acting on the lever arrangement.

The movement of the lever arrangement back into the initial position is effected by the movement of the lid or is at least initiated by the movement of the lid to its release position, meaning that not only does the respective lid move the lever arrangement into the contact making position but it also returns it to the initial position when this particular lid is moved to the release position.

For defined closing of the current path by means of the switch associated with the lever arrangement, it is desirable that the lever arrangement include at least one control cam that opens or closes the motor switching contact of the switch. This control cam may be configured in respect of the rotary or pivotal movement of the lever arrangement such that the motor switching contact is prevented from closing until the lid actuating the lever arrangement occupies a closed position in which it is securely held or locked on the processing container without enabling further manipulation by the user.

Each lid should have a pin-type protrusion engaging in the associated lever arm or in a section of the lever arrangement. With such a pin-type protrusion it can be ensured that the lever arrangement is actuatable—for closing the motor switching contact—only when the lid is properly positioned on the processing container and moved to its locked position, because otherwise, that is, with the lid improperly fitted to the processing container, the pin-type protrusion of the lid is prevented from engaging the lever arrangement.

In addition, for a defined engagement of the pin-type protrusion with the lever arm, a fork or claw shaped section may be formed at the end of each lever arm; such an end section could be dimensioned such that the tines or claws engage the pin-type protrusion on either side when in the contact making position, causing the lever arm and the pin to be in relative engagement and to be prevented from disengagement, even when an external force is applied, unless the lid is again moved to its release position according to proper procedure. Still further, it is preferable for the tine of the fork or the claw member producing the contact making position to be of greater length than the other tine of the fork or claw member, resulting in sufficient clearance space for the pin to disengage itself from the tines or claws of the lever arm in the release position, while on the other hand in the operating position the pin securely engages the lever arm as mentioned previously, keeping the lever arm in the closed position for the motor switching contact.

Particularly when only small amounts of, or thin-liquid, food materials have been processed in the processing container it may happen that the motor continues to rotate for a long period after shut-off and/or after opening of the lid and hence the return of the lever arrangement. In such an event there would be the risk that the processing tool, for example, a cutting tool, continues to rotate when the user removes the lid from the processing container immediately thereafter. To eliminate such a risk, it is preferable to provide a motor braking current switching contact. This motor braking current switching contact is equally associated with the lever arrangement and actuated by the movement of the lever arrangement. Such a motor braking current switching contact is closed when the lever arrangement is in the initial position. The switching contact releases a braking current in the motor winding which then acts against the motor rotation, braking the motor. As a result, the processing tool rotating in the processing container comes to a halt speedily. To initiate the braking of the motor rotation at a very early instant of time, the motor braking current switching contact is closed immediately after the motor switching contact opens.

To make sure that the lever arrangement returns to its initial position also when, for any reason, it should be pivoted into the operating position in which the motor switching contact is closed, the switching contact should be configured as a spring such as to support the returning of the lever arrangement into the initial position. Additionally however, a spring element may be fitted to the lever arrangement as mentioned previously, which supports this returning of the lever arrangement into the initial position.

Further details and features of the present invention will become apparent from the subsequent description of an embodiment with reference to the accompanying drawings.

Figure 2:
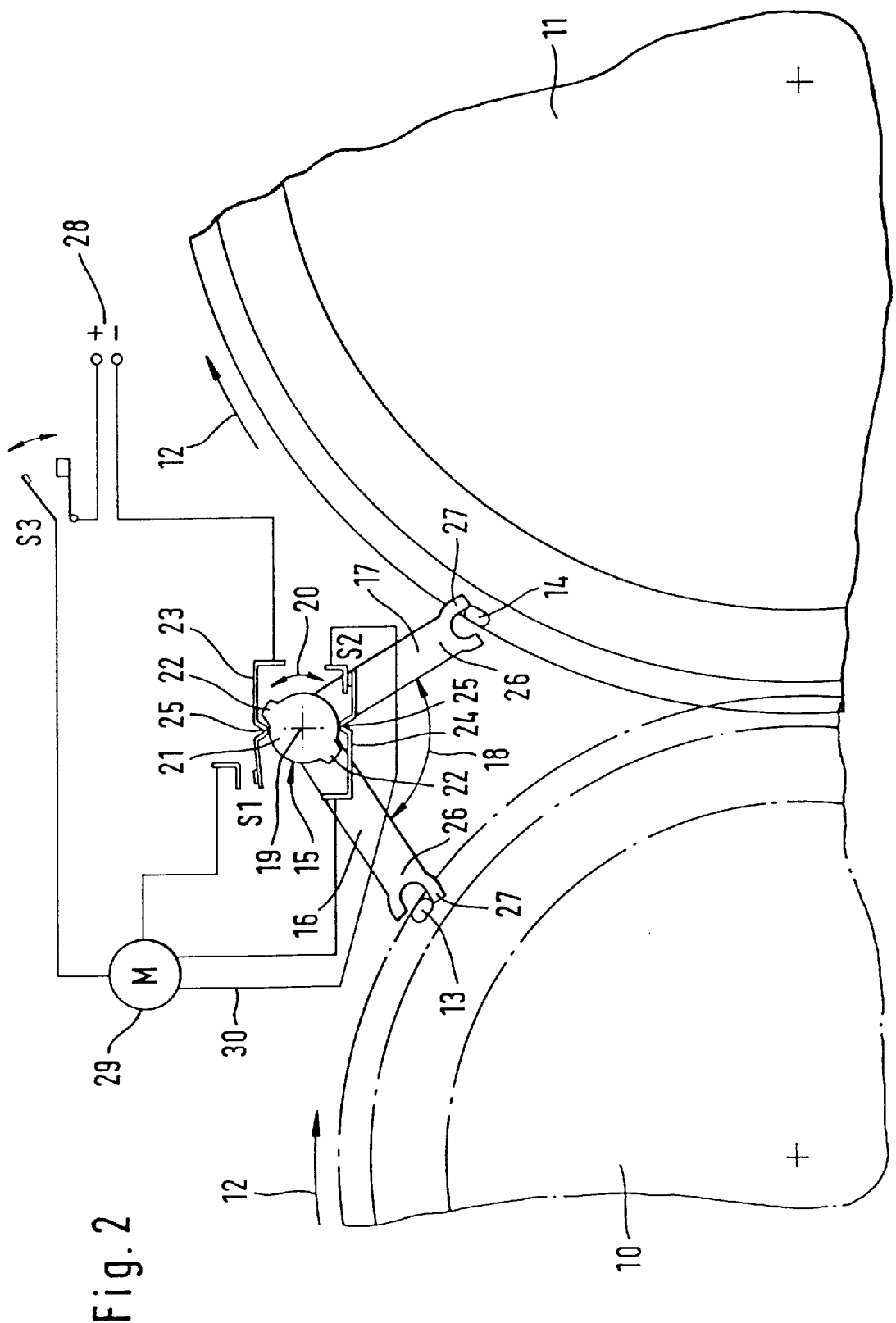

In the drawings,

FIG. 1 is a perspective view of a food processor having two processing containers, showing schematically in a housing central section a safety device in the form of a lever arrangement which is associated with the two processing containers; and FIG. 2 is a view, on an enlarged scale, of only the lever arrangement, showing parts of the processing containers in a top plan view and the electric circuit in a schematic diagram.

The food processor of the type illustrated in FIG. 1 has a base unit 1 with two mounts 2, 3 each for one processing container 4, 5. In the rear housing area between the two mounts 2, 3 or the respective processing containers 4, 5, a tower-like housing 6 extends from the base unit 1 upwardly. Among other purposes, this tower-like housing 6 may serve to accommodate an electric motor.

Two rotary switches 8 are disposed on a front sloping control panel 7, one switch operating as a main switch for turning the electric motor on or off by hand.

Processing tools 9 of different configurations are fitted to a drive spindle, not shown in greater detail, in the respective containers 4, 5, said spindle being in driving connection with an electric motor (not shown) by means of a drive train disposed in the lower housing unit 1.

To process food materials with the food processor shown, the left-hand processing container 4 or the right-hand processing container 5 is placed on its assigned mount 2 or 3. The two processing containers 4, 5 differ in capacity, and in addition, their processing tools 9 may have their speeds reduced or increased with respect to the motor speed, depending on the work needing to be performed.

The container 4, 5 is then locked in its respective mount 2, 3 and closed with a respective lid 10, 11. Independent of the associated container 4, 5, the respective lid 10, 11 is rotated into a locked position according to the direction of rotation of the respective arrows 12. Rotation of the lid 10 or 11 may also take place together with the processing container 4 or 5 in case the processing container 4, 5 is placed into its respective mount 2, 3 with a lid 10, 11 already locked in place.

As illustrated in FIG. 1 and in greater detail in FIG. 2, each lid 10, 11 carries at a defined location in its outer peripheral area a vertically upwardly protruding pin 13, 14. These two pins 13, 14 are associated with a lever arrangement generally identified by reference numeral 15. The lever arrangement 15 comprises two sections in the form of two lever arms 16, 17 having their longitudinal dimensions oriented a defined angle 18.

The lever arrangement 15 is pivotal about a pivot axis 19 in the direction of the double arrow 20. Furthermore, a cam disk 21 is fixedly secured to the lever arms 16, 17 in the area of the pivot axis 19, that is, the cam disk occupies a predefined position relative to the two lever arms 16, 17. Two control cams 22 are formed on the cam disk 21, whereof the one control cam 22, in FIG. 2 the upper one, is associated with a motor switching contact 23, while the lower control cam 22 is associated with a motor braking current switching contact 24. By rotation of the lever arrangement 15 and hence of the cam disk 21 in the direction of the double arrow 20, the two control cams 22 engage each with switching contact projections 25, causing the respective switching contact 23 or 24 to be moved to the effect that a switch S1 for the motor operating current is closed and a switch S2 for a motor braking current is opened.

The mode of operation of the safety device formed by the aforedescribed structure comprising the lever arrangement 15 as an essential component is as follows:

The two lever arms 16, 17 are dimensioned and configured such as to move from an initial position illustrated in FIG. 2 into engagement with the pin 13 and 14, respectively. To this effect, a claw 26 is formed at the end of each lever arm 16, 17. As seen in the direction of rotation, a rearward longer claw member 27 ensures that the respective pin 13 and 14 reliably engages within the claw 26 in the closing direction. Proceeding from the initial position illustrated in FIG. 2, upon further rotation of the respective lid 10, 11 in the direction of the arrow 12 the respective lever arm 16, 17 is pivoted and the cam disk 21 is rotated in the clockwise direction.

With the lid 10, 11 in an end position, the switch S1 is closed and the switch S2 is opened. Closing of the switch S1 causes closing of the one current path from the power source 28 to the motor 29, so that when the switch S3 incorporated in one of the rotary switches 8 illustrated in FIG. 1 is closed, power is supplied to the motor 29 which then starts running. In the event that the lid 10 or 11, which has been moved into engagement with the corresponding lever arm 16 or 17 and has closed the switch S1, is unlocked again from its locked position while the appliance is in operation, the respective lever arm 16 or 17 is pivoted by the pin 13 or 14 in counterclockwise direction, causing the cam disk 21 to rotate in clockwise direction. The cam 22 is then moved out of its engagement with the switching contact projection 25, causing the switch Si to be opened and hence the supply of power to the motor 29 to be interrupted.

At the same time, rotation of the cam disk 21 in clockwise direction causes the lower control cam 22 to be moved out of engagement with the switching contact projection 25 of the motor braking current switching contact and to open the switch S2 which closes a circuit—indicated by the two lines 30—to the motor 29, in order to brake the motor. In the initial position, the food processor is then not operable because the switch S1 is open, operation being prevented also when the switch S3, that is, the main switch, is closed.

While in FIG. 2 the lids 10, 11 of the two processing containers 4, 5 are illustrated schematically to make it clear that the respective pins 13, 14 are associated with the lever arms 16, 17 of the lever arrangement 15 and adapted to engage within the claws 26, it will be understood that conventionally provisions are made according to which either only the left-hand processing container 4 or only the right-hand processing container 5 can be placed on the base unit 1 for operation.

As becomes apparent from FIG. 1, the lever arrangement 15 is arranged at the upper end of the tower-like housing 6 beneath a housing lid 31, and the end sections of the lever arms 16, 17, that is, the two claws 26, protrude from slots, not shown in greater detail, in order to be able to engage with the pins 13, 14 of the lids 10, 11.

As will be recognized from the preceding description, with this lever arrangement 15 a very simple and yet effective structure is accomplished in order to obtain high-degree reliability of the food processor to the effect that the food processor is prevented from operating until the processing container 4, 5 and its respective lid 10, 11 are properly positioned, thus ruling out the possibility for the user to reach inside an open processing container 4, 5 while the processing tool 9 is running.

We claim:

1. A food processor, comprising a base unit (1, 6) having at least two separate mounts (2, 3) for one processing container (4, 5) each, with a respective rotary drive shaft being disposed in the area of each mount (2, 3), which drive shaft is adapted to drive a processing tool (9) insertable into the processing container (4, 5) for the processing of food materials, said drive shafts being connected to an electric motor (29) by a transmission mechanism, and with a switch device (S1) being provided downstream from and in series with a manually actuatable main switch (8; S3) to enable electric current to be released to the motor (29), said switch device being adapted to be turned on or off by movement of a lid (10, 11) which closes or opens the respective processing container (2, 3), such that an actuating element (13, 14) formed on the lid (10, 11) displaces a lever arrangement (15) connected with the switch device (S1) in such fashion as to cause actuation of a switching contact (23), characterized in that the lids (10, 11) are assigned a common motor switching contact (23) for the release of electric current to the motor (29), and that said motor switching contact (23) is actuatable by a lever arrangement (15) mounted in the housing (6) and comprising two sections (16, 17), with the position of the lever arrangement (15) relative to the position of the lids (10, 11) of the processing containers (2, 3) being oriented such that the one section (16) of the lever arrangement (15) is actuable by the actuating element(13) of the one lid (10), while the other section (17) of the lever arrangement (15) is actuatable by the actuating element (14) of the other lid (11).

2. The food processor as claimed in claim 1, characterized in that when the container (4, 5) is opened the lever arrangement (15; 16, 17) is automatically returned to its initial position by the lid (10, 11), using the force of a spring (23, 24) acting on the lever arrangement (15; 16, 17).

3. The food processor as claimed in claim 2, characterized in that the return motion of the lever arrangement (15; 16, 17) is at least initiated by the movement of the lid (10, 11).

4. The food processor as claimed in claim 1, characterized in that the lever arrangement (15) is connected with at least one control cam (22) that opens or closes the motor switching contact(23; S1).

5. The food processor as claimed in claim 1, characterized in that each lid (10, 11) has a pin-type protruion (13, 14) engaging in an associated lever arm (16, 17) of the lever arrangement (15).

6. The food processor as claimed in claim 5, characterized in that the pin-type protrusion (13, 14) engages within a fork or claw shaped end section end of the lever arm (16, 17).

7. The food processor as claimed in claim 6, characterized in that the tines of the forks or the claw members (27) of the claw (26) engage the pin-type protrusion (13, 14) on either side when in the contact making position.

8. The food processor as claimed in claim 1, characterized in that the tine of the fork or the claw member (27) producing the contact making position of the switching contact (23) is of greater length than the other tine of the fork or claw member.

9. The food processor as claimed in claim 1, characterized in that a motor braking current switching contact (24; S2) is associated with the lever arrangement (15) and actuable by the movement of the lever arrangement (15), said contact being closed with the lever arrangement (15) in the initial position and closing a braking circuit to the winding of the motor (29).

10. The food processor as claimed in claim 9, characterized in that the motor braking current switching contact (24, S2) closes immediately after the motor switching contact (23; S1) opens.

* * * * *